Figure 1:
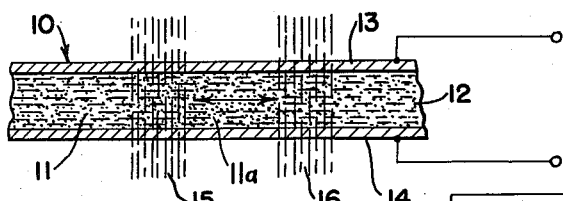

June 27, 1961        W. H. LEE        2,990,485

HOMOPOLAR GENERATOR

Filed June 18, 1956        2 Sheets-Sheet 1

INVENTOR.
WILLIAM H. LEE
BY
ATTORNEY

June 27, 1961 W. H. LEE 2,990,485
HOMOPOLAR GENERATOR
Filed June 18, 1956 2 Sheets-Sheet 2

INVENTOR.
WILLIAM H. LEE
BY
ATTORNEY

United States Patent Office
2,990,485
Patented June 27, 1961

2,990,485
HOMOPOLAR GENERATOR
William H. Lee, 1110 Jungle Ave., St. Petersburg, Fla.
Filed June 18, 1956, Ser. No. 592,113
8 Claims. (Cl. 310—178)

This invention pertains to the art of electric motor generators and, more particularly to a unitary electric motor and homopolar generator.

Homopolar electric generators are ordinarily employed to generate direct electrical currents at very high amperages and relatively low voltages. Ordinarily, they consist of an electric motor direct connected to a solid or rigid annulus of electrically conductive material supported for rotation in a homopolar magnetic field. An example of such a generator is disclosed in United States Letters Patent No. 2,640,942, to Caputo et al. Conventional bearings are used to support the rotating annulus in position and slip rings and brushes are employed to feed the electrical voltage generated from the moving annulus to the load.

Such motor generators are relatively bulky and expensive to build because of the need for the bearings for supporting the rotor; the brushes; the slip rings, and the separate motor.

The present invention contemplates a homopolar generator which overcomes all of the above-referred to difficulties and others and provides a homopolar generator which is compact, simple in construction, electrically efficient and economical to manufacture.

In accordance with the present invention, there is provided a closed loop or housing having sides of insulating material, an electrically conductive fluid in such loop, means for imposing a moving magnetic field on the fluid for causing the fluid to move in such loop, means for imposing a homopolar magnetic field through the sides of such loop as the fluid moves so that a voltage will be generated therein and electrically conductive means at the sides of the loop transverse to the direction of the homopolar magnetic field for connecting a load to the moving fluid medium.

The term "fluid" as used in the present description and claims is intended to include any material which is both electrically conductive and is either a liquid or a gas at the temperature of operation of the generator. Obviously, if it is possible to operate the generator at temperatures above the molten temperature of either aluminum or copper, the invention would then include such materials.

The moving magnetic field may be produced either by a constant source of magnetic flux which is physically moved relative to the fluid or by a stationary source of magnetic flux, the strength of which is varied in such a manner as to effectively produce an apparent moving magnetic flux field.

The principal object of the invention is the provision of a new and improved homopolar motor and generator which is simple in construction, economical to build and efficient electrically.

Another object of the invention is the provision of a new and improved homopolar generator wherein the movable member is an annulus or loop of an electrically conductive fluid.

Another object of the invention is the provision of a new and improved combined homopolar generator and motor which does not have supporting bearings, brushes or slip-rings.

Still another object of the invention is the provision of a new and improved motor generator arrangement wherein a multiphase moving magnetic field is employed to force an electrically conductive fluid medium through a second magnetic field whereby to generate an electric voltage in the fluid medium.

A still further object of the invention is to provide a direct current generator of the homopolar type in which an electrically conductive liquid is propelled through the homopolar magnetic field by means of a polyphase magnetic field.

A still further object of the invention is to provide a generator comprising an annular uni-directional magnetic field, a liquid annulus within said field, a polyphase magnetic field for rotating the annulus in the field and causing electrical energy to be generated in the annulus and energy collector rings at each axial end of the annulus for feeding the electrical energy generated to an external load.

Figure 2:
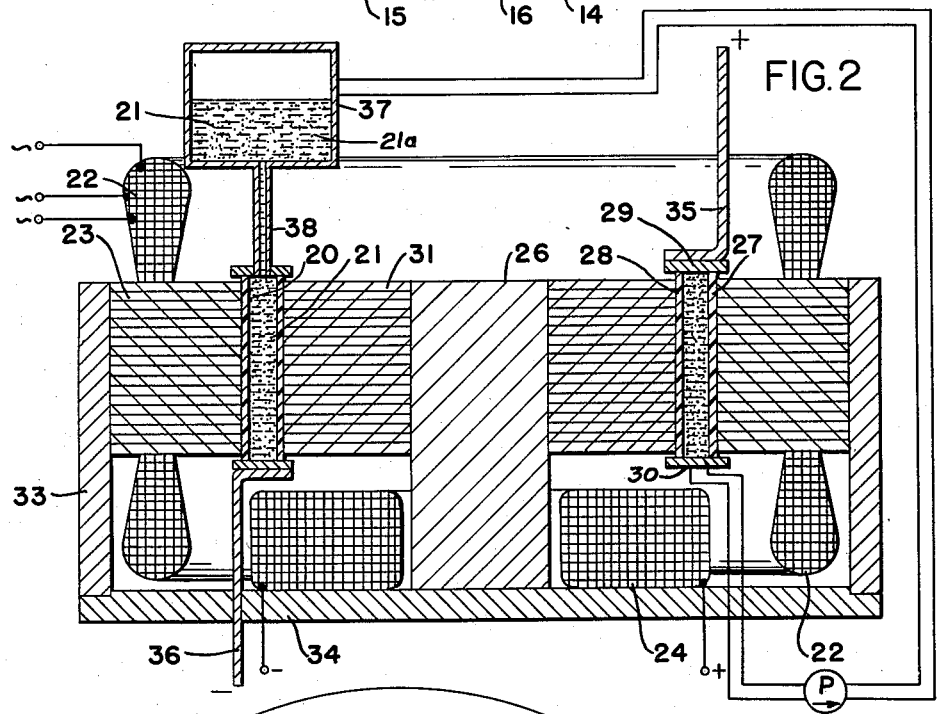
Figure 3:
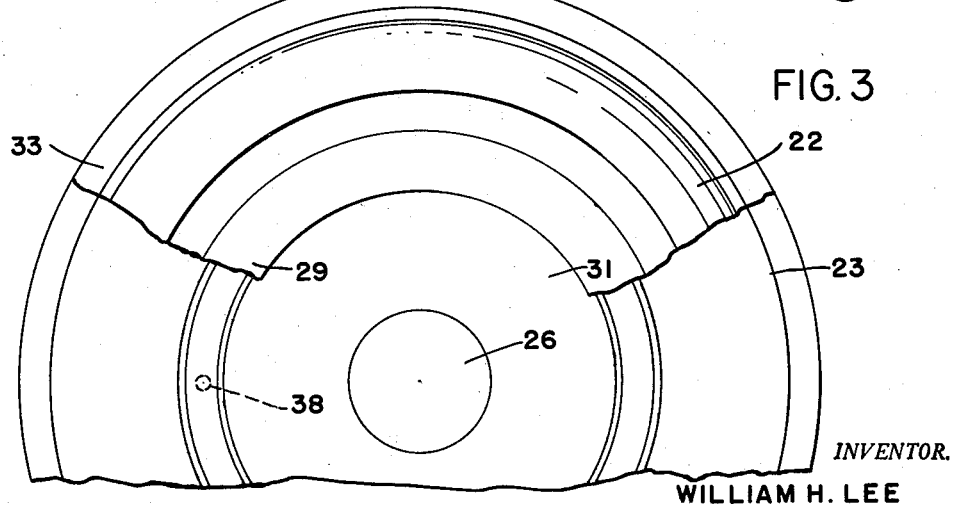
Figure 4:
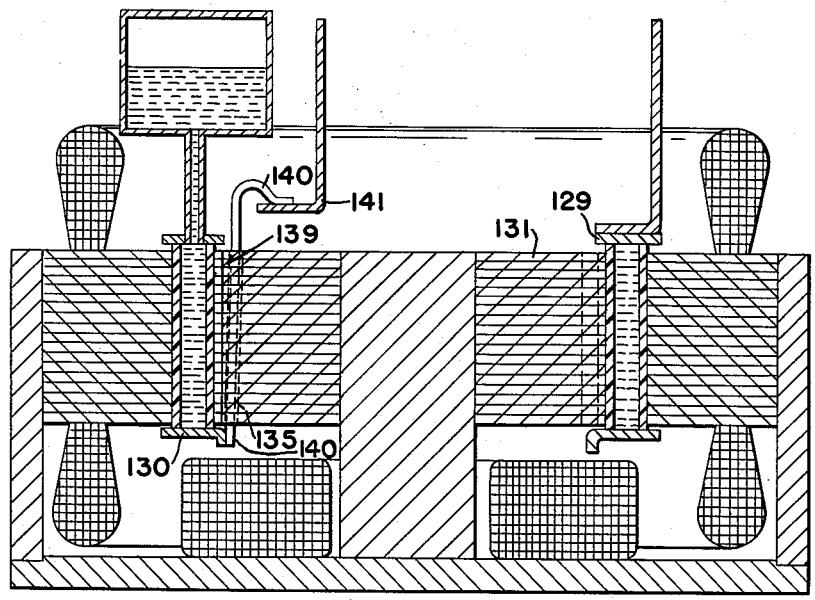
Figure 5:
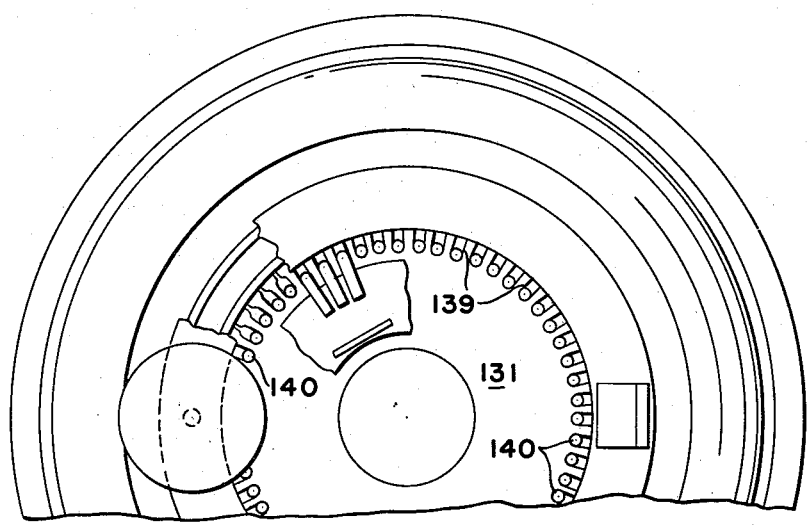

The invention may take physical form in certain parts and arrangements of parts, a preferred embodiment of which will be described in detail in this specification and illustrated in the accompanying drawings which are a part hereof and wherein:

FIGURE 1 is a schematic view showing the principles of the invention bodily applied to a liquid being propelled through one magnetic field by another magnetic field to generate voltages in the liquid, FIGURE 2 is a cross-sectional view of a combined homopolar and motor illustrating a preferred embodiment of the invention, FIGURE 3 is a top plan view of FIGURE 2, FIGURE 4 is a side cross-sectional view somewhat similar to FIGURE 2 illustrating a modified embodiment of the invention, and FIGURE 5 is a top plan view of FIGURE 4 with portions broken away to show the construction thereof.

Referring now to the drawings wherein the showings are for the purpose of illustrating preferred embodiments of the invention and not for the purpose of limiting same, FIGURE 1 shows the invention schematically in the form of a housing 10 containing an electrically conductive liquid 11. The housing 10 may be constructed as desired but is shown as having spaced opposite sidewalls 12 of electrically insulating material and end walls of electrically conductive material 13, 14 which walls form the current collectors for the generator.

The material of the side walls 12 may be of any known electrically insulating material but are preferably made of an insulating material having a high magnetic permeability such as a hardened plastic material of electrically insulating material having imbedded therein magnetically permeable materials such as iron powder in amounts such that the material will be an electrical insulator but will have the desired magnetic properties.

The end walls 13, 14 are preferably made of copper or other material having a high electrical conductivity.

The liquid 11 in the preferred embodiment is comprised of a mixture of 56% potassium and 44% sodium, which has a melting point of 45° F. and an electrical resistance of 41.6 micro-ohms per centimeter at 100° F. This particular mixture is chosen because of the various potassium-sodium mixtures it has approximately the lowest electrical resistance.

If desired, the magnetic properties of the liquid 11 may be improved by the addition of iron powder 11a or other similar magnetic material.

Alternatively, a eutectic mixture of 78% potassium and 22% of sodium, having a melting temperature of 14° F. and an electrical resistance of 45.6 micro-ohms per centimeter at 100° F. could be employed, either with or without the iron powder.

Mercury because of its higher resistivity of 94.1 micro-ohms per centimeter at 100° F. is not as desirable as the above mixtures, although its melting point is quite low.

Mercury because of its high inertia would have advantages in power supplies requiring high currents for short periods 21a such as in spot welding applications or in testing circuits requiring millions of watt-seconds of electrical energy at low voltage D.C.

It is believed that ionized gases may also be employed where high voltages must be produced. Using ionized gases, large diameters of the loop may be employed and thus large speeds in the loop may be obtained without the attendant disadvantage of high centrifugal forces or fluid resistance.

It is to be emphasized that the liquid 11 may be solid at room temperatures inasmuch as its temperature would soon be raised to the melting temperature by the currents induced therein when the fields are energized.

It is to be noted that with a magnetically permeable side-wall 12 and iron powder in the liquid 11, the effective air gap of the apparatus can be substantially reduced.

The liquid 11 may be propelled or otherwise moved through the housing 10 in electrical engagement with the end walls 13, 14 by means of pumps or other external means but preferably by means of a propelling magnetic field 15 of the alternating polyphase type which as known exerts a moving or mechanical force on any electrically conductive members which cut its lines of force. The speed of movement will be proportioned to the frequency and the number of poles as is conventional in A.C. motors.

A second or current-inducing magnetic field 16 is provided having lines of force extending parallel to the end walls 13 or 14 or, more specifically, through the walls 12. As the liquid 11 is propelled or moved through this magnetic field 16, a voltage is generated therein in an amount proportional to its speed of movement and force of the magnetic field 16. When the magnetic field 16 is uni-directional, the voltage and current produced is direct.

The magnetic fields 15 and 16 may also be superimposed one on the other as shown in FIGURE 2 instead of being placed at spaced locations as illustrated for purposes of description and clarify in FIGURE 1.

Thus, in FIGURE 2 the magnetic fields are illustrated in superimposed locations. In this embodiment, the housing takes the form of a pair of spaced outer and inner coaxial sleeves 27, 28 of electrically insulating material defining a space therebetween in which the liquid 21 is supported. The ends of the sleeves 27, 28 are closed by means of upper and lower rings 29, 30 of electrically conductive material which, as will be seen, are in electrical contact with the entire periphery of the liquid 21.

A reservoir 37 of the liquid 21 is provided, positioned above the upper collector ring 29 and connected thereto through a tube 38. Obviously, this reservoir 37 could be connected to the interior of the housing 20 in any desired manner. An inert gas may be used over the upper surface of the liquid 21 in the reservoir 37 to pressurize the reservoir and to prevent chemical reaction between the atmosphere and the liquid 21.

For the purpose of propelling the liquid 21, a moving magnetic field threads through the liquid 21 to induce currents in the liquid and cause physical movement thereof. This moving magnetic field may be either permanent or direct current magnetic poles physically driven by an electric motor, or as is shown in the preferred embodiment, of field coils 22 of the alternating current polyphase type mounted in conventional coil slots formed on the inner surface of a stack of magnetically permeable laminations 23. The inner periphery of this stack of laminations bears against the outer surface of the sleeve 27. The magnetic field of the coils 22 is thus projected through the sleeve 27 into the electrically conductive liquid 21 which is then caused to rotate in the manner well known in ordinary alternating current motors.

The sleeve 27 should preferably be as thin as possible so that the resultant air gap is as small as possible. To further reduce the air gap caused by the sleeve 27, it and its opposite sleeve 28 may be made of magnetic material. In some cases, if desired, the sleeve 27 may be formed of alternate magnetic and non-magnetic portions so that the magnetic material does not bridge the coil slots.

Means for providing a homopolar generator field on the liquid 21 are provided in the form of a D.C. field coil 24 surrounding a core 26 extending upwardly therefrom and, in turn, supporting a stack of magnetically permeable laminations 31 which extend radially outwardly from the core 26 and bear against the inner surface of the sleeve 28. This sleeve may be of a uniform magnetically permeable material.

It will be noted that the motor field is supported in an outer sleeve 33 also of magnetically permeable material and this sleeve rests on a base 34 of magnetically permeable material on which the core 26 also rests. The magnetic lines of force generated by the field coil 24 thus extend in a closed loop through the core 26, the laminations 31, through the liquid 21, the laminations 23, the outer sleeve 33 and the base plate 34. As the liquid 21 moves in this homopolar magnetic field, a voltage is generated therein which is conducted to the collector rings 29 and 30. Terminals 35, 36 are connected to the collector rings 29 and 30 respectively so that the voltages generated can be carried to an external load.

In the embodiment shown in FIGURES 4 and 5, the construction is essentially identical with that shown in FIGURES 2 and 3 with the single exception that a plurality of conductors 140 are brought upwardly through slots 139 in the outer periphery of the laminations 131 from the lower collector ring 130 and a common terminal 141 connects to these conductors 140 above the apparatus. Electrical insulation 135 is employed to insulate the conductors 140 from the sides of the slots 139. Preferably, the slots and thus the conductors 140 are skewed circumferentially and axially relative to the axis of movement of the liquid 21. By this arrangement, the cross-magnetization in the field structure can be reduced and by the skewing a compound series field effect is produced. In the preferred embodiment, the amount of skewing is between 45° to 90° of the periphery of the motor although obviously the amount of skewing may be more or less as desired.

If the slots and conductors 140 are not skewed, A.C. voltages will be induced in the conductors which will cause circulating currents to flow through the conductors, the collector ring 130, and the terminal 141, as in a squirrel cage rotor of an induction motor. However, if the slots and conductors are skewed approximately one pole pitch, the net voltage induced in each conductor will be nearly zero and circulating currents will be negligible. Additional compounding, cumulative or differential, may then be obtained by skewing the conductors between the core and the lower collector ring 130.

The apparatus described is capable of producing electric currents on the order of 100,000 amperes D.C. at a voltage of 20 or less volts. Because of the large cross-sectional area of the liquid 21, the effective resistance of the liquid 21 may be held relatively low even though the specific resistivity of the liquid is somewhat higher than that of copper.

If the fluid is acted upon by a D.C. field rotated by some mechanical means instead of a polyphase alternating magnetic field, the machine could act as a generator converting mechanical energy from a rotating shaft into electrical energy at low voltage D.C.

The liquid 21 will obviously heat as the electric currents flow therethrough. Suitable means may be provided for removing this generated heat; such as, cooling coils within the liquid annulus 21 or the liquid may be continuously pumped through external cooling means as desired. It will be noted that if fluid is fed into the inner periphery of the annulus 21 and taken out from the outer periphery, the centrifugal forces on the liquid can be employed as the pumping means for forcing the liquid through the auxiliary cooling means.

Obviously, if the coil 24 has D.C. current flowing therein, a D.C. voltage will be generated. If the coil 24 has an alternating current flowing therein, an alternating voltage will be generated of a frequency corresponding to the frequency of the current in the coil 24.

No specific details are given as to the design of the polyphase motor field coils as this is believed known to those skilled in the art. Also, no specific details are given as to the specific core dimensions as it is believed that this is also known to those skilled in the art. It should be recognized that a second D.C. field coil, end plate, and core could be provided on the opposite end of the machine to form a second parallel path for the homopolar flux. This would conform to practice in conventional homopolar generators.

Preferred embodiments of the invention have been described as required by the patent statutes. Obviously, modifications and alterations of the invention differing radically in appearance from the preferred embodiments shown will occur to others upon a reading and understanding of this specification and it is my intention to include all such modifications and alterations insofar as they come within the scope of the appended claims.

Having thus described my invention, I claim:

1. A homopolar generator comprising: a stator member, a core member within said stator and radially spaced therefrom to form an annular gap therebetween, polyphase field coils in one of said members to produce a polyphase magnetic field in said gap, means to produce a unidirectional magnetic field in said gap, flux-conducting means connecting adjacent ends of said members, current conductor collector rings on each end of said stator member and core member and bridging said gap between the stator and core, insulating material on the inside of said stator and the outside of said core and engaging said rings to provide an annular housing encircling said core and positioned within said stator, an electrically conductive liquid in said housing and engaging said collector rings, one of said members having longitudinal slots in the periphery thereof, conductors connected to one of said collector rings and extending through said slots, and means for energizing said field coils with a polyphase current capable of producing a polyphase magnetic field which can propel the liquid through the housing.

2. A homopolar generator comprising: housing means defining a closed loop path, electrically conductive fluid in said housing means, means for establishing a unidirectional magnetic field in said fluid when the fluid is moved along said closed loop path to produce current in the moving fluid, and driving means energized independent of said last mentioned means for moving said fluid continuously along said closed loop path.

3. A homopolar generator comprising a hollow annular housing including radially spaced, annular, electrically insulating inner and outer walls and annular, axially spaced, opposite end walls of current-conducting material which extend between said radially spaced inner and outer walls throughout the annular extent of said housing and which define collector rings, said inner and outer walls and said end walls together defining between them an annular chamber in the housing, current-conducting liquid filling said annular chamber and engaging said end walls throughout the annular length of the latter, means for producing magnetic flux fields in said chamber which react on said liquid to move the liquid lengthwise in a closed annular path through said annular chamber, and means for establishing in the moving liquid a unidirectional magnetic field to induce a unidirectional electromotive force in the liquid between said end walls when the liquid is moved along the annular length of said annular chamber.

4. The generator of claim 3 wherein said inner and outer walls have high magnetic permeability, and said liquid contains powdered magnetically permeable material.

5. The generator of claim 4 wherein said first-mentioned means is in the form of polyphase alternating current-energized coil means encircling said housing.

6. A method of generating electric current comprising the steps of: providing a closed loop path for an electrically conductive fluid, establishing a driving magnetic field in said fluid and effectively moving said driving field lengthwise along said closed loop path to cause the fluid to move continuously along said path, and establishing an additional magnetic field in said fluid transverse to the direction of movement of said fluid through said closed loop path which is capable of producing a current to said moving fluid.

7. The method of claim 6 further characterized by providing an alternating polyphase magnetic field along said closed loop path to establish and effectively move said driving magnetic field.

8. The method of claim 7 wherein said driving field and said additional field both extend the full length of said closed loop path and are superimposed upon one another.

References Cited in the file of this patent

UNITED STATES PATENTS

| | | |
|---|---|---|
| 957,242 | Noeggerath | May 10, 1910 |
| 1,196,511 | Borger | Aug. 29, 1916 |
| 1,298,664 | Chubb | Apr. 1, 1919 |
| 1,530,468 | Elliott | Mar. 17, 1925 |
| 2,669,873 | Gardner et al. | Feb. 23, 1954 |
| 2,669,931 | Godbold | Feb. 23, 1954 |
| 2,786,416 | Fenemore | Mar. 26, 1957 |